(12) United States Patent
Gutt et al.

(10) Patent No.: US 9,009,796 B2
(45) Date of Patent: Apr. 14, 2015

(54) SPOT BEAM BASED AUTHENTICATION

(75) Inventors: Gregory M. Gutt, Ashburn, VA (US); David A. Whelan, Newport Coast, VA (US); Arun Ayyagari, Seattle, WA (US)

(73) Assignee: The Boeing Company, Chicago, IL (US)

( * ) Notice: Subject to any disclaimer, the term of this patent is extended or adjusted under 35 U.S.C. 154(b) by 345 days.

(21) Appl. No.: 12/949,404

(22) Filed: Nov. 18, 2010

(65) Prior Publication Data

US 2012/0131650 A1   May 24, 2012

(51) Int. Cl.
| | |
|---|---|
| *H04L 9/32* | (2006.01) |
| *G06F 21/00* | (2013.01) |
| *H04W 48/04* | (2009.01) |
| *G06F 21/44* | (2013.01) |
| *H04W 4/02* | (2009.01) |
| *H04B 7/185* | (2006.01) |

(52) U.S. Cl.
CPC ............ *H04L 9/3236* (2013.01); *H04W 48/04* (2013.01); *G06F 21/44* (2013.01); *H04W 4/023* (2013.01); *H04B 7/18593* (2013.01); *H04L 9/3297* (2013.01); *G06F 2221/2111* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 3,974,582 A | 8/1976 | Jantzen, Jr. | |
| 5,757,916 A * | 5/1998 | MacDoran et al. | ........... 380/258 |
| 6,101,178 A | 8/2000 | Beal | |
| 6,271,788 B1 | 8/2001 | Longaker et al. | |
| 6,370,629 B1 * | 4/2002 | Hastings et al. | .............. 711/163 |
| 6,430,504 B1 | 8/2002 | Gilbert et al. | |
| 6,453,168 B1 | 9/2002 | McCrady et al. | |
| 6,564,064 B1 | 5/2003 | Ciganer et al. | |
| 7,042,392 B2 | 5/2006 | Whelan et al. | |
| 7,058,414 B1 | 6/2006 | Rofheart et al. | |
| 7,058,968 B2 | 6/2006 | Rowland et al. | |
| 7,114,183 B1 | 9/2006 | Joiner | |
| 7,372,400 B2 | 5/2008 | Cohen et al. | |
| 7,450,930 B2 | 11/2008 | Williams et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |

(Continued)

FOREIGN PATENT DOCUMENTS

| | | |
|---|---|---|
| CA | 2531410 A1 | 6/2007 |
| EP | 0997808 A1 | 5/2000 |

(Continued)

OTHER PUBLICATIONS

Tim Dierks, Independent Eric Rescorla RTFM, "The TLS Protocol, Version 1.1" May 1, 2005.

(Continued)

*Primary Examiner* — Andrew Nalven
*Assistant Examiner* — Christopher Ruprecht
(74) *Attorney, Agent, or Firm* — Toler Law Group, PC

(57) ABSTRACT

In one embodiment, a method to authenticate a claimant comprises receiving, from the claimant, at least one of a set of beam data from a spot beam transmission, comparing the claimed at least one set of beam data to a known valid data set, and authenticating the claimant when a difference between at least one set of beam data and the known valid data set is less than a threshold.

31 Claims, 7 Drawing Sheets

(56) References Cited

U.S. PATENT DOCUMENTS

| | | |
|---|---|---|
| 7,583,225 B2 | 9/2009 | Cohen et al. |
| 7,619,559 B2 | 11/2009 | DiEsposti |
| 7,688,261 B2 | 3/2010 | DiEsposti |
| 7,733,804 B2 | 6/2010 | Hardjono et al. |
| 7,865,717 B2 | 1/2011 | Calcev et al. |
| 7,984,294 B1 | 7/2011 | Goringe et al. |
| 7,996,882 B2 | 8/2011 | L'Heureux et al. |
| 8,046,490 B1 | 10/2011 | Wu |
| 8,051,292 B2 | 11/2011 | Shen-Orr |
| 8,126,971 B2 | 2/2012 | Shuster |
| 8,156,539 B1 | 4/2012 | Nelson |
| 8,312,064 B1 | 11/2012 | Gauvin |
| 2001/0002822 A1 | 6/2001 | Watters et al. |
| 2002/0123343 A1 | 9/2002 | Wideman et al. |
| 2002/0138632 A1 | 9/2002 | Bade et al. |
| 2003/0204579 A1 | 10/2003 | Lutz |
| 2003/0216143 A1 | 11/2003 | Roese et al. |
| 2004/0025018 A1 | 2/2004 | Haas et al. |
| 2004/0059914 A1 | 3/2004 | Karaoguz |
| 2004/0192353 A1 | 9/2004 | Mason et al. |
| 2004/0252053 A1* | 12/2004 | Harvey ............... 342/357.15 |
| 2005/0159891 A1 | 7/2005 | Cohen et al. |
| 2007/0028098 A1 | 2/2007 | Baartman et al. |
| 2007/0189184 A1 | 8/2007 | Ryu et al. |
| 2007/0192805 A1* | 8/2007 | Dutta et al. ............... 725/64 |
| 2008/0010365 A1 | 1/2008 | Schneider |
| 2008/0059059 A1 | 3/2008 | Cohen et al. |
| 2008/0143605 A1 | 6/2008 | Bornholdt |
| 2008/0146246 A1 | 6/2008 | Bornholdt |
| 2009/0059842 A1 | 3/2009 | Maltseff et al. |
| 2009/0069035 A1 | 3/2009 | Igval |
| 2009/0089869 A1 | 4/2009 | Varghese |
| 2009/0171583 A1 | 7/2009 | DiEsposti |
| 2009/0174597 A1 | 7/2009 | DeLellio et al. |
| 2009/0228210 A1 | 9/2009 | Gutt |
| 2009/0252161 A1 | 10/2009 | Morris |
| 2009/0315764 A1* | 12/2009 | Cohen et al. ............ 342/357.05 |
| 2009/0315769 A1 | 12/2009 | Whelan et al. |
| 2010/0079333 A1 | 4/2010 | Janky et al. |
| 2010/0171652 A1 | 7/2010 | Gutt et al. |
| 2011/0075845 A1 | 3/2011 | Calcev et al. |
| 2011/0181466 A1* | 7/2011 | Serrano et al. ........... 342/357.68 |
| 2011/0222589 A1 | 9/2011 | Howell et al. |
| 2011/0238484 A1 | 9/2011 | Toumayan et al. |
| 2012/0133552 A1* | 5/2012 | Wu ............... 342/357.23 |
| 2013/0019317 A1 | 1/2013 | Whelan et al. |
| 2013/0232565 A1 | 9/2013 | O'Connor, at al. |

FOREIGN PATENT DOCUMENTS

| | | |
|---|---|---|
| EP | 0997808 A2 | 5/2000 |
| EP | 2 573 998 A2 | 3/2013 |
| EP | 2573998 A2 | 3/2013 |
| WO | WO9713341 A1 | 4/1997 |
| WO | 03075125 A2 | 9/2003 |
| WO | WO 03 075125 A2 | 12/2003 |
| WO | 2004049637 A1 | 6/2004 |
| WO | WO 2004 049637 A1 | 10/2004 |
| WO | 2006002458 A1 | 1/2006 |
| WO | WO 2006 002458 A1 | 12/2006 |
| WO | 2007148212 A2 | 12/2007 |
| WO | WO 2007 148212 A2 | 12/2007 |

OTHER PUBLICATIONS

Chapter 12: Key Establshment Protocols, Handbook of Applied Cryptography, Oct. 1, 1996.
ISR dated Nov. 9, 2011.
Extended EP Search Report for European Application No. 12182801.6-1853 mailed on Jul. 25, 2013, 6 pages.
Extended European Search Report, Application No. 12182801.6-1853/2573998, Jul. 25, 2013.
Partial European Search Report, Application No. 12190444.5-1870/2587717, May 27, 2014.
International Search Report, PCT/US2013/020554, Mar. 19, 2013.
PCT Written Opinion of the International Search Authority, PCT/US2013/020554, Mar. 19, 2013.
Wang, et al., "A Routing Protocol Based on Trust for MANETs", Jan. 1, 2005, Grid and Cooperative Computing—GCC 2005 Lecture Notes in Computer Science; LNCS, Springer, Berlin, DE, pp. 959-064, XP019024872, ISBN: 978-3-540-30510-1, abstract, section 1, section 2.
PCT International Search Report and Written Opinion, for PCT Application No, PCT/US2013/038282, Aug. 12, 2013.
PCT International Search Report, International Application No. PCT/US2013/072388, Mar. 5, 2014.
Garcia-Teodoro, P. et al., "Anomaly-based network intrusion detection: Techniques, systems and challenges", Computers and Security, Elsevier Science Publishers, Amsterdam, NL, vol. 28, No. 1-2, Feb. 1, 2009, pp. 18-28, XP025839371, ISSN: 0167-4048, DOI: 10.1018/J.COSE.2008.08.003; p. 18, col. 2, lines 13-19; col. 1, line 5; p. 19, col. 1, lines 21-32; p. 19, col. 2, lines 29-39; p. 20, col. 1, lines 8-11; p. 20, col. 1, line 17-col. 2, line 2; Section 2.3 Machine learning-based A-NIDS schemes.
Stefan Ruhrup, "Theory and Practice of Geographic Routing", Department of Computer Science, University of Freiburg, Germany, Feb. 2009.
Martin Mauve, et al., "A Survey on Position-Based Routing in Mobile Ad Hoc Networks", IEEE Network, Nov./Dec. 2001.
Young-Bee Ko, et al., "Location-Aided Routing (LAR) in Mobile Ad Hoc Networks", Wireless Networks 6 (2000) 307-321.
International Search Report, PCT/US2014/011927, Apr. 1, 2014.
Tanachaiwiwat S., et al., "Secure Locations: Routing on Trust and Isolating Compromised Sensors in Location-Aware Sensor Networks", Sensys '03, Proceedings on the 1st International Conference on Embedded Networked Sensor Systems, Los Angeles, CA, Nov. 5-7, 2003; [Proceedings of the International Conference on Embedded Networked Sensor Systems], New York, NY: ACM, US, vol. Conf. 1, Nov. 1, 2003, p. 324/325, XP015054122, DOI: 10.1145/958491.958542, ISBN: 978-1-58113-707-1, p. 324, paragraph Section 1 "Introduction" p. 324, paragraph Section 2 "TRANS"—p. 325.
Ardagna et al., 'Supporting Location Based Conditions in Access Control Policies'; Proceedings of the 2006 ACM Symposium on Information, computer and communications security (ASIACCS'06), Taipei, Taiwan, Mar. 21-24, 2006, http://doi.acm.org/10.1145/1128817.1128850.

* cited by examiner

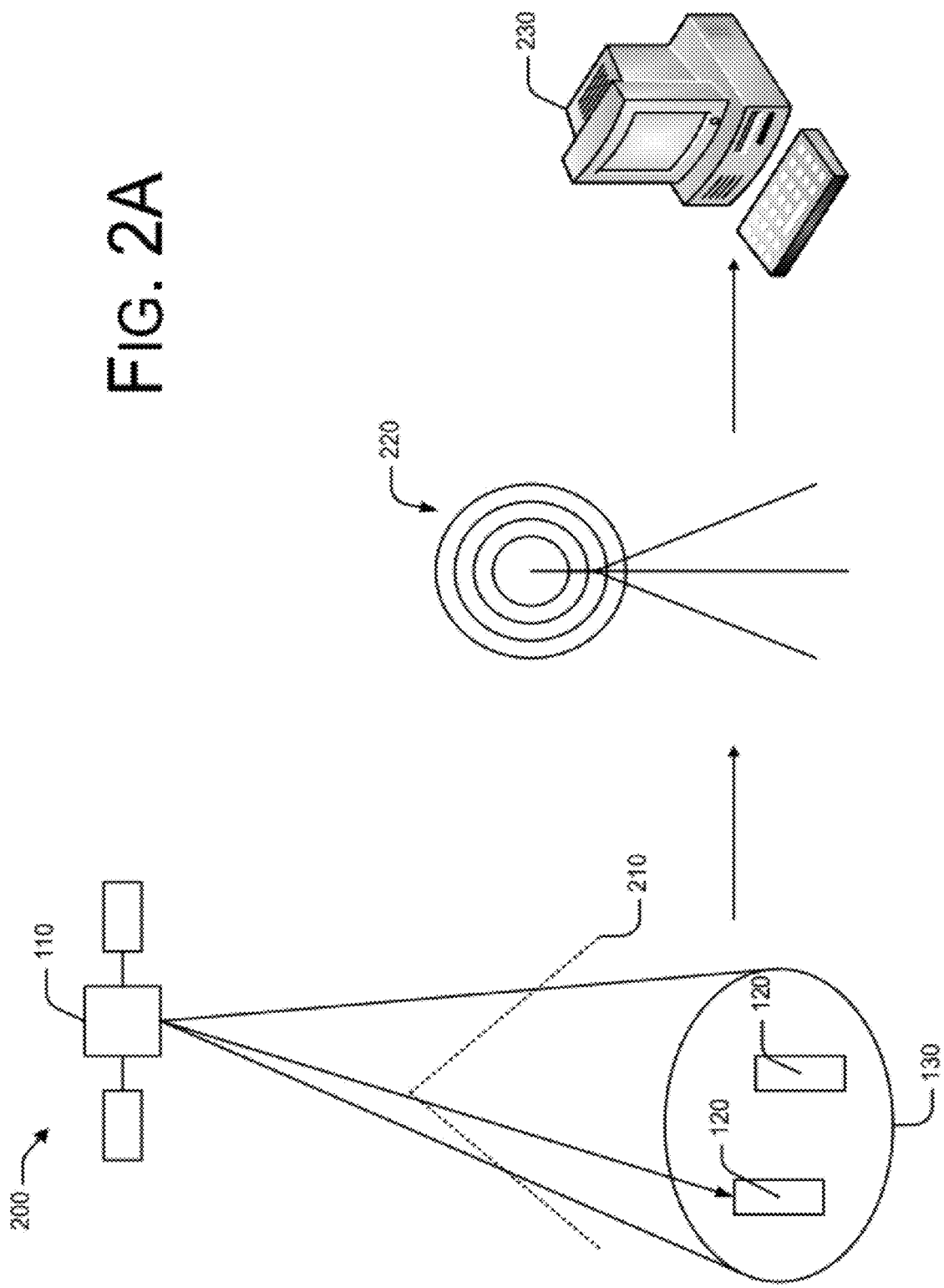

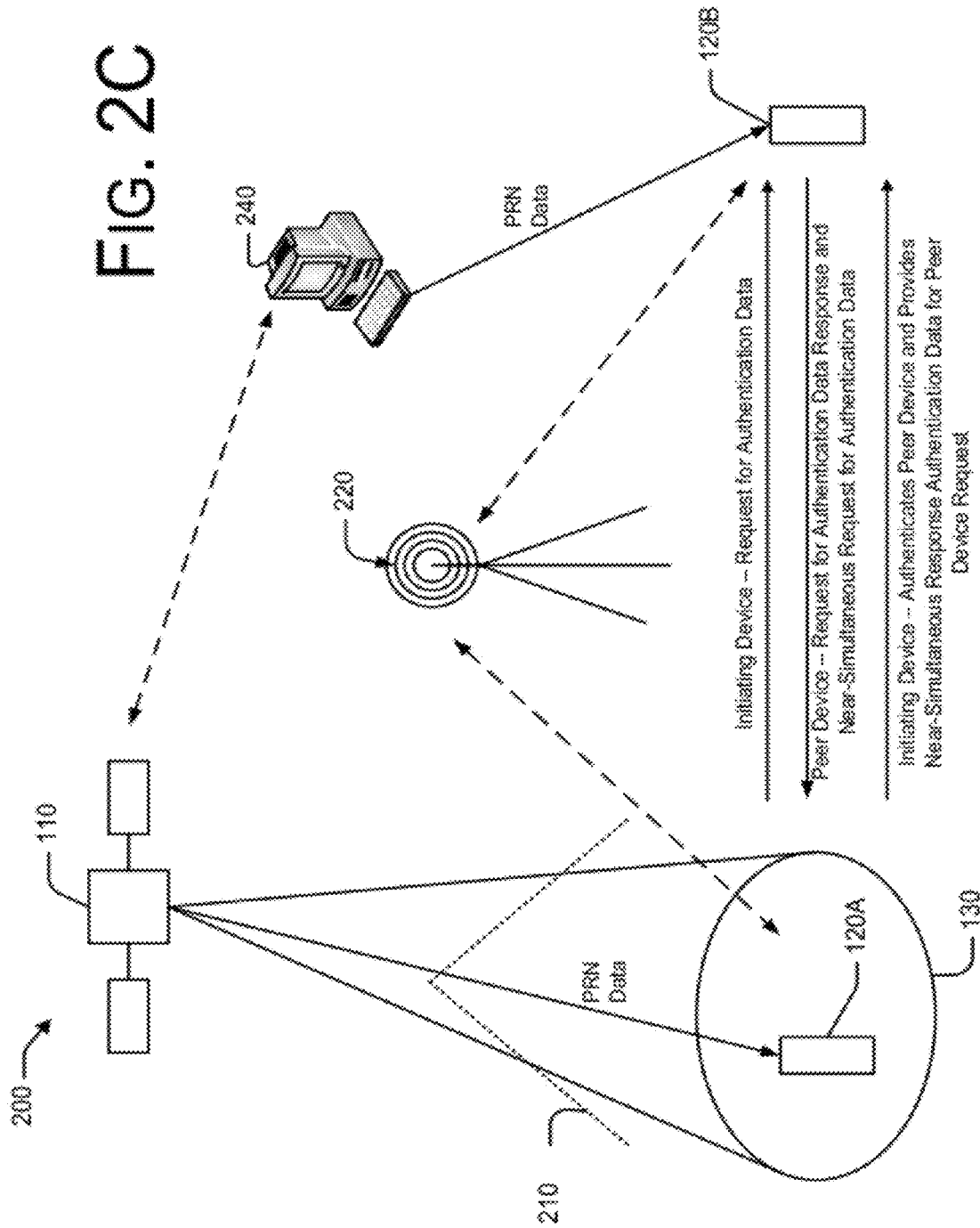

SPOT BEAM BASED AUTHENTICATION

RELATED APPLICATIONS

None

BACKGROUND

The subject matter described herein relates to electronic communication and network security, and more particularly to authentication techniques which may be used in satellite based systems for reducing system vulnerabilities.

Electronic security and network security remain an important infrastructural elements as electronic communication and data transmittal systems including networks become more engrained into society. Such systems are utilized for extensive data processing and general processes through the web and other networks whose vulnerability threatens our national infrastructure. Both foreign and domestic efforts to infiltrate, compromise, and/or disable infrastructural elements are increasing and thus there is a need to bolster computing security in order to protect these systems from these growing threats. Access of these systems by an unauthorized party, may have varying degrees of societal impact and while any given attack may seem to be less significant in nature, it could be the predecessor to a more aggressive future attack. Electronic systems world-wide are seeing a dramatic increase in cyber attacks. Cyber attacks often stem from network vulnerabilities and are often conducted by impersonating a legitimate end user.

Existing methods to detect unauthorized users or compromised electronic systems are lacking, in that, even if an attack is discovered the culprit's methods may hide where the unauthorized access originated from. This issue creates additional problems in that if the attack is believed to have originated in, for instance, a foreign country, the inability to validate the general vicinity of the unauthorized user, means that officials may not be able to seek amends or more aggressively pressure foreign countries for conducting such cyber attacks on the United States.

Existing identity verification methods are, in general, non-dynamic, such as passwords, pins, etc. that leave systems more vulnerable to interception and other brute force hacking methods.

Accordingly, additional techniques used to restrict access to unauthorized users as well as techniques to authenticate one or more parties attempting to access electronic communication or networks could strengthen these existing system's security.

BRIEF DESCRIPTION OF THE DRAWINGS

The detailed description is described with reference to the accompanying figures.

FIGS. 2A, 2B and 2C are schematic illustrations of satellite-based authentication systems, according to embodiments.

SUMMARY

Figure 1:
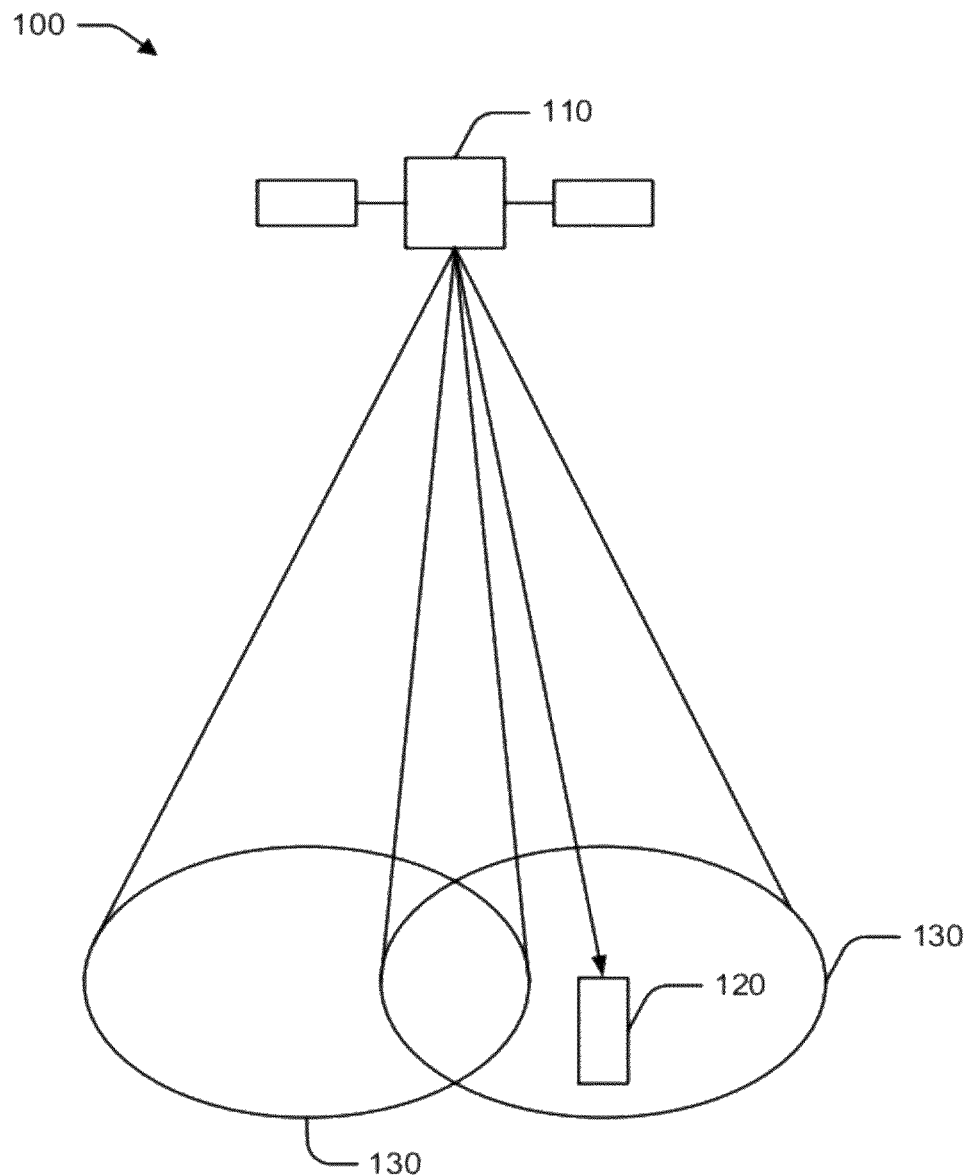
FIG. 1 is a schematic illustration of a satellite-based communication system, according to embodiments.

Described herein are an apparatus, systems, and methods for spot beam based authentication. In one or more embodiments, a method to authenticate a claimant involves a satellite transmitting distinctive beam data via a spot beam, a claimant capturing said data from said satellite transmission, a claimant transmitting the data to a verifier which may include the use of a mediatory means of data transmission, the verifier then authenticating the claimant when the difference between the claimed data and the known valid data set is within a defined threshold. In one or more embodiments, the claimant is provided access to a system or resource once they have been authenticated via this "one-way" authentication method. In one or more embodiments, a third party verifier may complete authentication of the claimant for a host network. In one or more embodiments the claimant may have a device that is capable of both receiving data and transmitting data, whereas in alternative embodiments the two functionalities may be housed in separate pieces of hardware coupled together.

In one or more embodiments, the data may be invalidated and the clamant is denied access. In one or more embodiments, the data may be marked as uncertain and may require additional data to authenticate the claimant. In one or more embodiments, the data may be marked as uncertain based on assigned tolerance levels and may either be promoted to authenticated or demoted to restricted. In one or more embodiments the claimant may transmit additional identifiers to the verifier for use in authentication which may include one of the following: satellite identifying information, other claimant captured data or derived information including location identifiers (e.g. earth-based coordinates, etc.), time, a pseudo-random code segment (i.e. an authentication key), and claimant distinctive data (e.g. passwords, keys, security certificates, etc.). As used herein the term "liveness" refers to these types of identifiers. In one or more embodiments, the authentication key may be transmitted through the spot beam and varied within the spot beam geometry as a function of time so that codes from varying spot beams are managed such that resultant optimum correlation properties are maintained. It is well understood in the art that multi-phased antenna arrays can be used to generate dynamic spot beams and thus, in at least one embodiment, a multi-phased antenna array may be used to generate the spot beams. In one or more embodiments, the claimant may transmit at least one waypoint datum to the verifier where this waypoint datum may be captured while the claimant may be mobile. In at least one embodiment, the waypoint datum may be captured while the claimant is at least at one point in time, stationary.

In at least one embodiment, beyond the one-way client authentication method, a multi-way authentication method is used for electronic computing devices to authenticate themselves to one another (i.e. two-way authentication, three-way authentication, and so on). An electronic computing device(s) may include a mobile phone, a portable computing device, a computer network node, a server, or a wireless networking node, etc. This method may be used for wireless and/or wired networks. This method allows devices to authenticate themselves to other devices, and may allow such devices to determine the degree or otherwise the extent of access to information and/or services that are granted after successful authentication. A service may include access to information such as secured networks (e.g. online banking, etc), secured databases, company email and other task oriented services, etc. or other secured resources included those tied into wired, wireless, and/or ad hoc networks. Furthermore, the degree or extent of access may also be context specific to one or more of the devices in this multi-way authentication method.

In at least one embodiment an apparatus to authenticate a claimant, comprises a processor and a memory module comprising logic instructions which, when executed, configure the processor to receive, from the claimant, at least one location identifier provided by the claimant and at least one set of waypoint data captured by the claimant from a satellite beam transmission, compare the at least one location identifier and the at least one set of waypoint data to a known valid data set, and authenticate the claimant when a difference between the at least one location identifier and the at least one set of waypoint data and the known data set is within a defined threshold.

In at least one embodiment, a system to authenticate a claimant comprises at least one low earth orbiting satellite to transmit a satellite beam in accordance with a known spot-beam geometry, at least one electronic device comprising a receiver to receive at least one set of waypoint data from the satellite beam and a location sensor to determine a location of the electronic device, and at least one verifier communicatively coupled to the at least one electronic device to authenticate a claimant using the location determined by the electronic device, the at least one set of waypoint data, and a known data set.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and elements have not been illustrated or described in detail so as not to obscure the particular embodiments.

Entity or user authentication techniques enable a third party verifier to validate the identity of a user, asset, or a device (e.g., a claimant) for a remote resource through a one-way authentication method. However, it should be noted that this one-way method may also be used directly by a host system to validate a claimant. An entity may be a device (e.g., a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However; this method can also be applied in a multi-way authentication technique to allow at least two peer devices to authenticate each other. In this one-way or multi-way device to device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This prevents a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$$P\_SHA\text{-}1(\text{initial-security key,liveness}) = SHA\text{-}1(\text{initial-security key},A(1)+\text{liveness}) + SHA\text{-}1(\text{initial-security key},A(2)+\text{liveness}) + SHA\text{-}1(\text{initial-security key},A(3)+\text{liveness}) + \quad \text{EQ 1:}$$

where A(0)=liveness;
A(i)=SHA-1(initial-security key, A(i−1));
and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$$PRF(\text{expanded initial-security key,label,liveness}) = P\_MD5(S1,\text{label}+\text{liveness}) \text{ XOR } P\_SHA\text{-}1(S2,\text{label}+\text{liveness}) \quad \text{EQ 2:}$$

where S1 is the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective ((g^(secret integer)) mod p). This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is required that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

FIG. 1 is a schematic illustration of a satellite-based communication system 100, according to embodiments. In practice, a satellite based communication system 100 may comprise of at least one satellite 110 in orbit. In the interest of brevity, a single satellite is illustrated in FIG. 1. Referring to FIG. 1, in some embodiments a system 100 comprises one or more satellites 110 in communication with one or more receiving devices 120. In some embodiments the satellites 110 may be embodied as LEO satellites such as those within the Iridium satellite constellation. Satellite(s) 110 orbit the earth in a known orbit and may transmit one or more spot beams 130 onto the surface of the earth in a known pattern. Each spot beam 130 may include information such as pseudorandom (PRN) data and one or more distinctive beam parameters (e.g. time, satellite ID, time bias, satellite orbit data, etc.).

Receiving device(s) 120 may be implemented as communication devices such as satellite or cellular phones or as components of a communication or computing device, e.g., a personal computer, laptop computer, personal digital assistant or the like. In some embodiments, a receiving device (120) may comprise one or more locating or navigation devices or modules analogous to devices used in connection with the global positioning system (GPS).

Figure 2B:
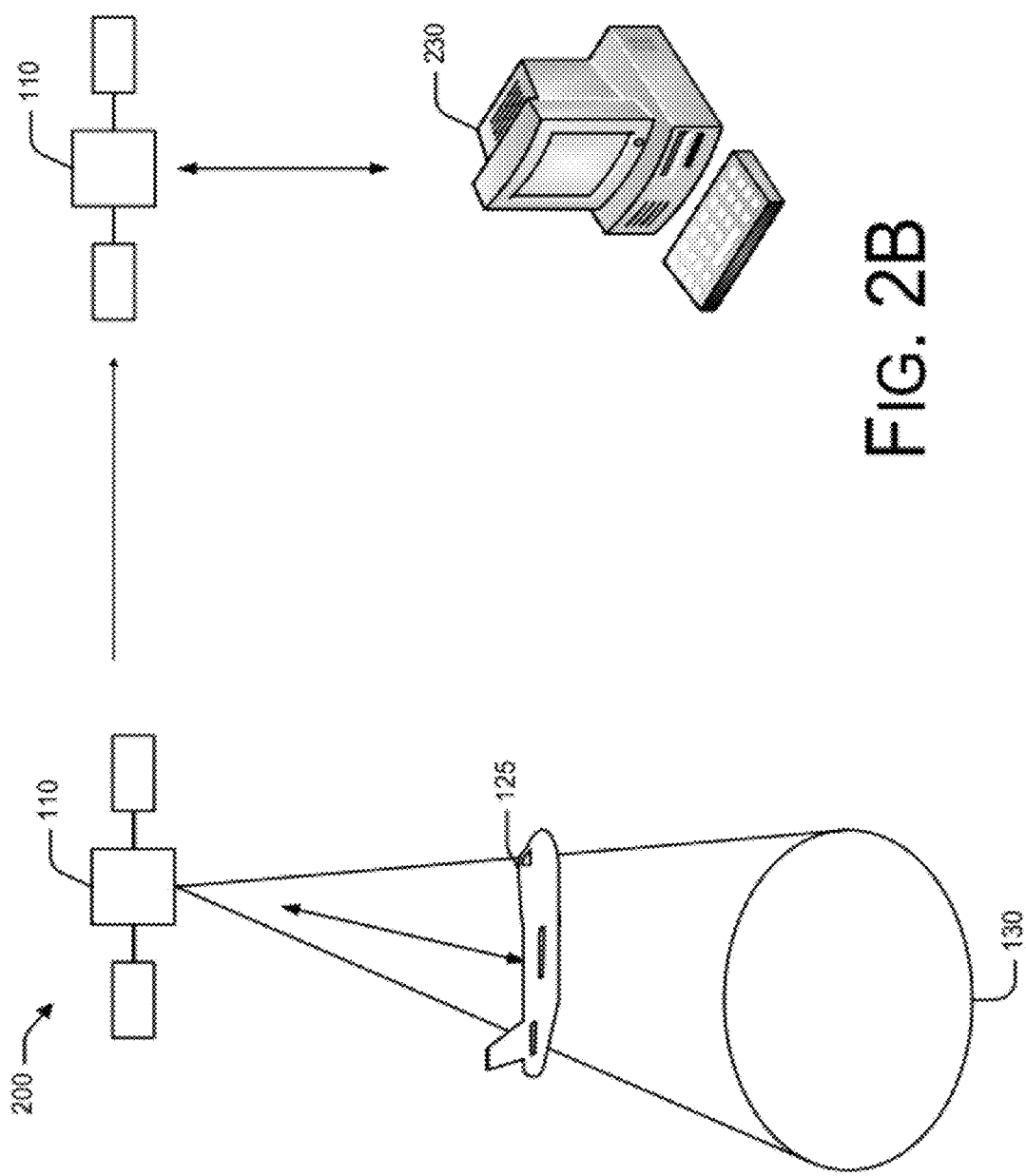

FIGS. 2A, 2B, and 2C are schematic illustrations of satellite-based authentication systems 200, according to embodiments. Referring first to FIG. 2A, in some embodiments a satellite 110 in orbit transmits one or more spot beams 130 onto the earth's surface. A receiving device 120 may be configured to receive a signal from the spot beam. In the embodiment depicted in FIG. 2A the receiving device is ground-based and may be operating in attenuated environment. By way of example, an object 210 such as a roof, building, or the like may obstruct a portion of the communication path between satellite 110 and the receiving device.

A transmitter 220 transmits data received by the receiving device 120 and/or data generated by the receiving device 120 to a verifier 230. The transmitter 220 depicted in FIG. 2 is a wireless transmitter that relays the data from the receiving device to the verifier. However, one skilled in the art will recognize that data from receiving device 120 may be transmitted via a wired communication system, wireless communication system, or a combination of wired and wireless systems. The verifier 230 uses data captured via a spot beam by the receiving device 120 to prove to the verifier 230 that it is an authorized user via a one-way authentication approach which is also the case in FIG. 2B.

Furthermore, FIG. 2B depicts an arrangement in which the receiving device 120 may be airborne, e.g., in an aircraft 125. In the embodiment depicted in FIG. 2B the aircraft 125 may maintain an uplink with the satellite 110, e.g., an L-Band Uplink, and data captured by the receiving device 120 in the aircraft may be transmitted back to the satellite 110 via the uplink. The satellite 110 may transmit the data to a second cross-linked satellite 110, which in turn may transmit the data to a verifier 230.

The system depicted in FIG. 2C illustrates an embodiment in which two (or more) peer devices 120 may implement a two-way authentication technique to authentication each other. Referring briefly to FIG. 2C as described above a satellite 110 in orbit transmits one or more spot beams 130 onto the earth's surface. A first receiving device 120A may be configured to receive a signal from the spot beam. The first receiving device 120A may be configured to derive a security key, e.g., using a Diffie-Helman approach as described above, which incorporates PRN data form the spot beam.

The PRN data is also transmitted to a second device 120B. In some embodiments the second device 120B may be outside the spot beam 130, in which case the PRN data may be transmitted by a computing device 240 coupled to the second device 120B via a communication network. The computing device 240 may be communicatively coupled to the satellite 110. By way of example, and not limitation, the computing device 240 may be a server that is separately coupled to the satellite 110 via a communication link. The computer 240 may be associated with a control network for satellite 110 and may thereby possess PRN data associated with the spot beam 130.

In operation, the first receiving device 120A initiates a request for authentication data, which is transmitted to the second receiving device 120B. The communication link between the first receiving device 120B may be direct or may be implemented through a transmit network 220. The second receiving device 120B responds to the request and issues a near-simultaneous request for authentication data from the first receiving device 120A. The first receiving device 120A authenticates the second receiving device 120B and issues a near-simultaneous response to for authentication data to the second receiving device 120B, which may then authenticate the first receiving device 120A.

As described above, the authentication process implemented between the first receiving device 120A and the second receiving device 120B may be a Diffie-Hellman exchange in which the shared secret comprises at least a portion of the PRN data transmitted by the spot beam 130. Thus, the system depicted in FIG. 2C enables peer-to-peer authentication of receiving device 120A, 120B. One skilled in the art will recognize that this two-way authentication approach could be extended to a receiving device and a server as well as other hardware architectures, or to more than two devices.

Figure 3A:
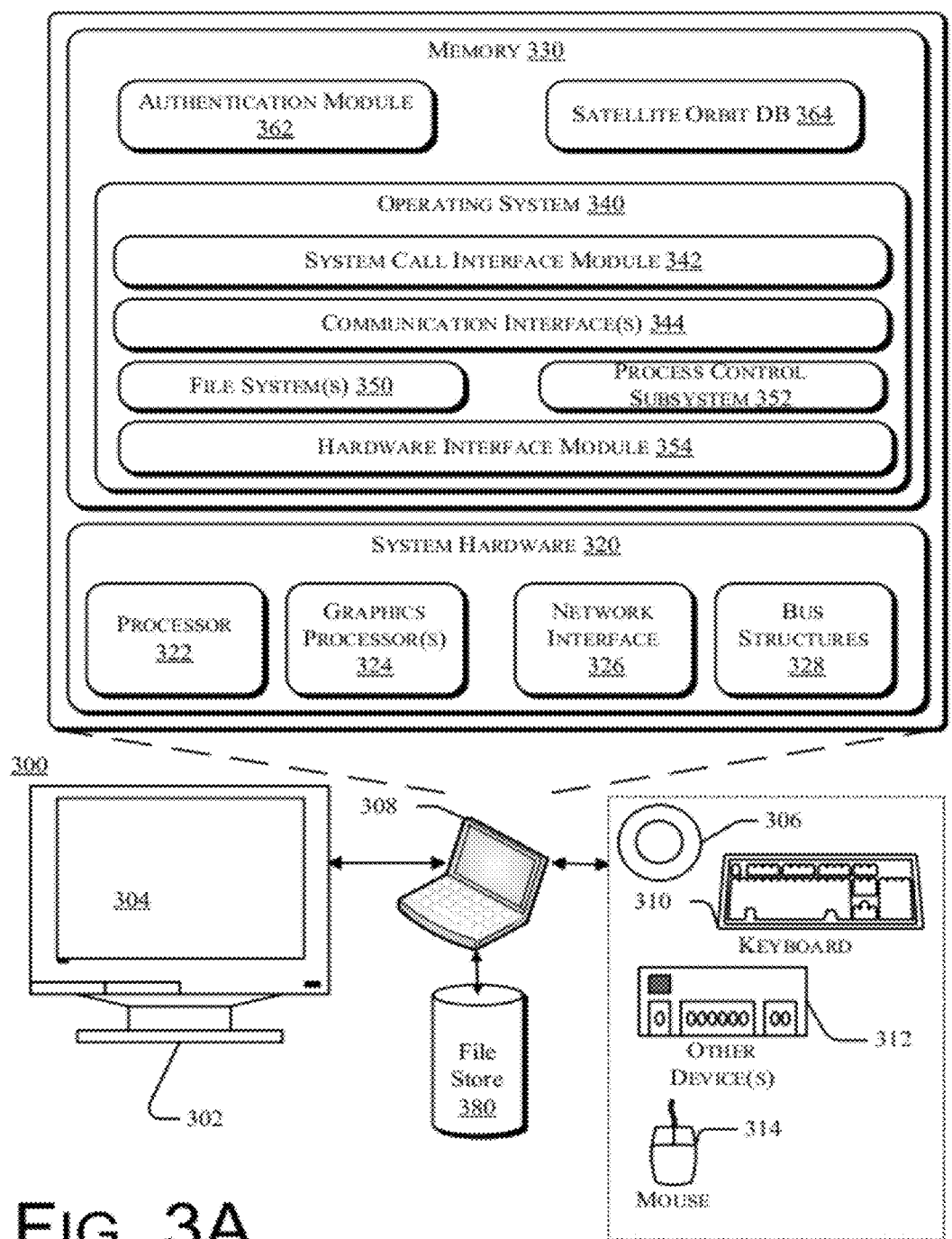
FIG. 3A is a schematic illustration of a computing device which may be adapted to implement a satellite based authentication system, according to embodiments.
Figure 3B:
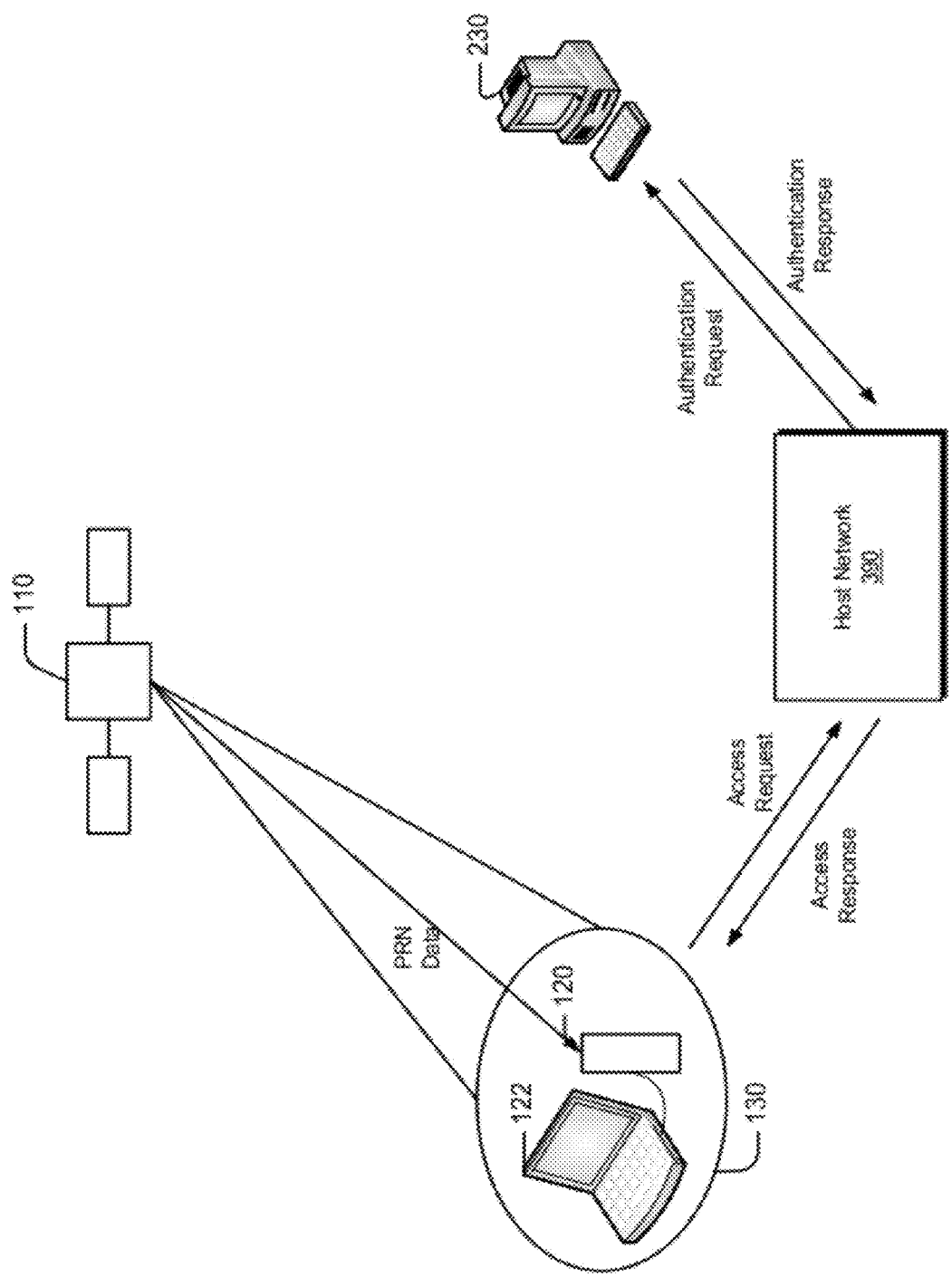
FIG. 3B is a schematic illustration of a satellite-based communication system, according to embodiments.

FIG. 3 is a schematic illustration of a computing system which may be adapted to implement a satellite based authentication system, according to embodiments. For example, in the embodiments depicted in FIGS. 2A and 2B the verifier 230 may be implemented by a computing system as depicted in FIG. 3. Referring to FIG. 3, in one embodiment, system 300 may include a computing device 308 and one or more accompanying input/output devices including a display 302 having a screen 304, one or more speakers 306, a keyboard 310, one or more other I/O device(s) 312, and a mouse 314. The other I/O device(s) 312 may include a touch screen, a voice-activated input device, a track ball, and any other device that allows the system 300 to receive input from a user.

The computing device 308 includes system hardware 320 and memory 330, which may be implemented as random access memory and/or read-only memory. A file store 380 may be communicatively coupled to computing device 308. File store 380 may be internal to computing device 308 such as, e.g., one or more hard drives, CD-ROM drives, DVD-ROM drives, or other types of storage devices. File store 380 may also be external to computer 308 such as, e.g., one or more external hard drives, network attached storage, or a separate storage network.

System hardware 320 may include one or more processors 322, at least two graphics processors 324, network interfaces 326, and bus structures 328. In one embodiment, processor 322 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 324 may function as adjunct processors that manage graphics and/or video operations. Graphics processors 324 may be integrated onto the motherboard of computing system 300 or may be coupled via an expansion slot on the motherboard.

In one embodiment, network interface 326 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 328 connect various components of system hardware 128. In one embodiment, bus structures 328 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 330 may include an operating system 340 for managing operations of computing device 308. In one embodiment, operating system 340 includes a hardware interface module 354 that provides an interface to system hardware 320. In addition, operating system 340 may include a file system 350 that manages files used in the operation of computing device 308 and a process control subsystem 352 that manages processes executing on computing device 308.

Operating system 340 may include (or manage) one or more communication interfaces that may operate in conjunction with system hardware 120 to transceive data packets and/or data streams from a remote source. Operating system 340 may further include a system call interface module 342 that provides an interface between the operating system 340 and one or more application modules resident in memory 330. Operating system 340 may be embodied as a UNIX operating system or any derivative thereof (e.g., Linux, Solaris, etc.) or as a Windows® brand operating system, or other operating systems.

In various embodiments, the computing device 308 may be embodied as a personal computer, a laptop computer, a personal digital assistant, a mobile telephone, an entertainment device, or another computing device.

In one embodiment, memory 330 includes an authentication module 362 to authenticate a claimant based on data received from the claimant. In one embodiment, an authentication module 362 may include logic instructions encoded in a non-transitory computer-readable medium which, when executed by processor 322, cause the processor 322 to authenticate a claimant based on data received from the claimant. In addition, memory 330 may comprise a satellite orbit database 364 which includes orbit information for satellites 110 in a predetermined orbit around the earth. Additional details about the authentication process and operations implemented by authentication module 362 are described below.

In some embodiments the receiving device 120 may be implemented as a satellite communication module adapted to couple with a conventional computing device 122 (e.g., a laptop, a PDA, or a smartphone device). The receiving device 120 may be coupled to the computing device 122 by a suitable communication connection, e.g., by a Universal Serial Bus (USB) interface, an RS-232 interface, an optical interface, or the like. In the embodiment depicted in FIG. 3B the receiving device 120 may be a "thin" device in the sense that it may include a receiver and limited processing capability, e.g., an application specific integrated circuit (ASIC) or a field programmable gate array (FPGA) configured to implement an authentication routine.

In operation, a user of the computing device 122 may utilize the receiving device 120 to authenticate the computing device 122 with a host network 390. As described above, the receiving device 120 depicted in FIG. 3 may receive a spot beam transmission 130 from the satellite 110 which includes a distinctive beam signature and a pseudo-random number (PRN). The computing device 122 may initiate an access request to the host network 390. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 110.

The host network 390 may transmit a user access request to the verifier 230 as an authentication request. In some embodiments the host network may add additional information to the request en enable the verifier 230 to authenticate the computer 122. By way of example, the host network 130 may provide limitations regarding where (i.e., from what geographic locations) the claimant may be authenticated). The verifier 230 may verify the claimant and provide an authentication response to the host network 390. The host network 390, in turn, may forward an access response to the computing device 122.

Figure 4:
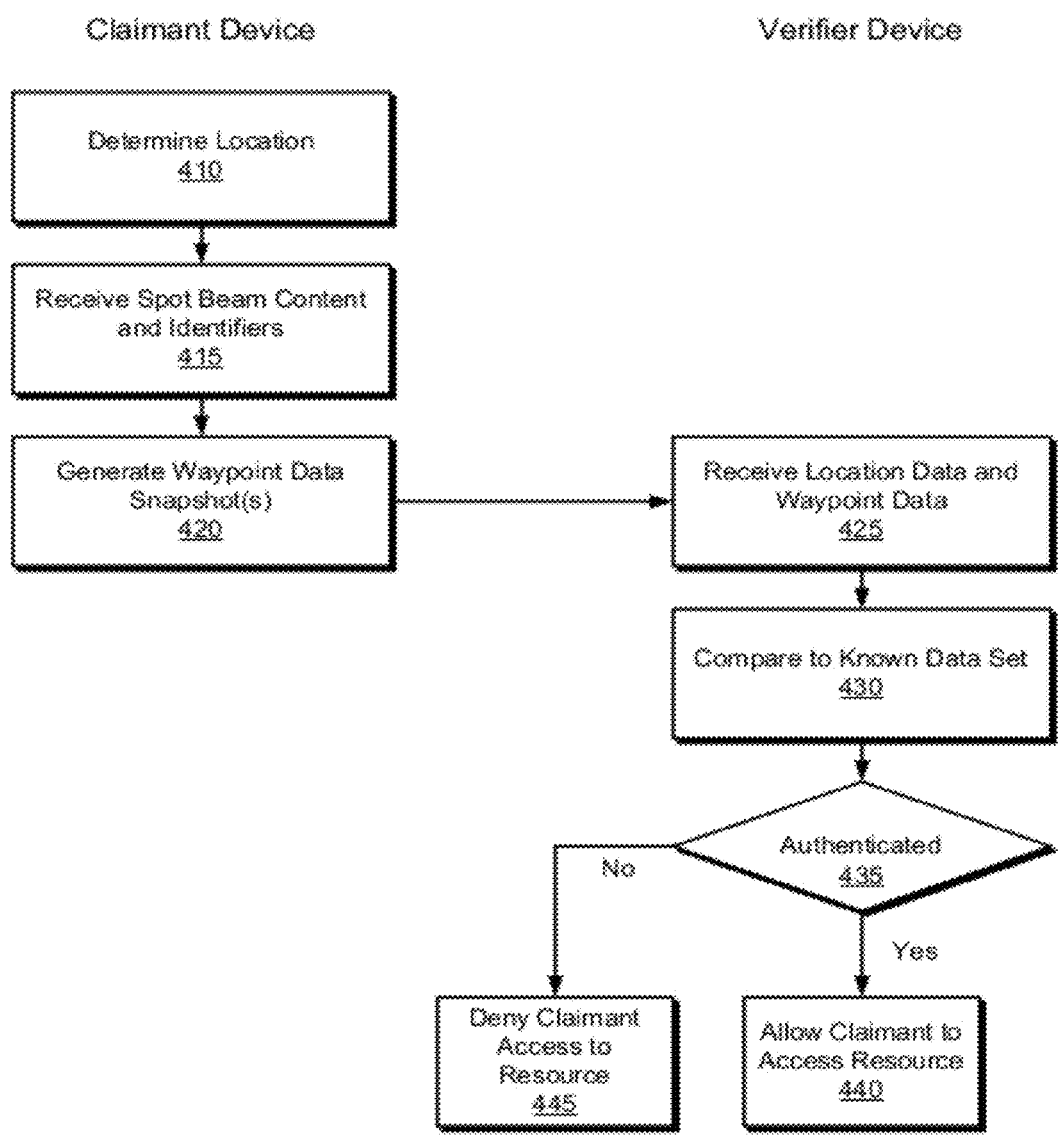
FIG. 4 is a flowchart illustrating operations in a method to authenticate a claimant, according to embodiments.

FIG. 4 is a flowchart illustrating operations in a method to authenticate a claimant, according to embodiments. Referring to FIG. 4, at operation 410 a claimant device determines a physical location of the claimant device. In some embodiments a claimant device 120 may comprise one or more location modules to determine a location of the claimant device 120. By way of example and not limitation, claimant device 120 may include, or be communicatively coupled to, a global positioning system (GPS) module to determine a location based on signals from the global positioning system. Alternatively, or in addition, claimant device 120 may include logic to determine a location based on signals from one or more LEO or MEO satellites 110 as described in one or more of U.S. Pat. Nos. 7,489,926, 7,372,400, 7,579,987, and 7,468,696, the disclosures of which are incorporated herein by reference in their respective entireties. In some embodiments the location of the claimant device 120 may be expressed in latitude/longitude coordinates or another earth-based coordinate system.

At operation 415 the claimant device 120 receives a spot beam transmission from a satellite 110. In some embodiments the claimant device 120 extracts one or more distinctive beam parameters (e.g. time, satellite ID, beam ID, time bias, satellite orbit data, etc.) including a pseudo random code segment from the satellite spot beam. In some embodiments the claimant device 120 may store the beam parameters in a memory module in, or communicatively coupled to, the claimant device 120. In one or more embodiments operation 415 may occur near simultaneously to its preceding operation 410.

At operation 420 the claimant device 120 may continue to generate one or more waypoint data snapshots which may include the location information for the claimant device 120 from operation 410, and one or more of the distinctive beam parameters transmitted via the satellite spot beam as noted in operation 420. In some embodiments the waypoint data snapshots may be stored in a memory module in, or communicatively coupled to, the claimant device 120.

In some embodiments the claimant device 120 may collect an array of waypoint data snapshots over time. For example an array of waypoint data snapshots may be constructed by receiving spot beams from a plurality of satellites 110 passing over the claimant device 120 over time. Alternatively, or in addition, an array of waypoint data snapshots may be constructed by moving the claimant device 120 in relation to the satellites 110, for example by placing the claimant device 120 in an aircraft 125 as depicted in FIG. 2B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 420 the waypoint data snapshot(s) are transferred from the claimant device 120 to a verifier device 230. By way of example, in the embodiment depicted in FIG. 2A the waypoint data snapshot(s) may be transmitted via a transmitter 220 or by another communication network. In the embodiment depicted in FIG. 2B the waypoint data snapshot(s) may be transmitted from the aircraft 125 to a satellite 110, then may be transmitted via a satellite network to a verifier device 230.

At operation 425 the verifier device 230 receives location data and waypoint data from the claimant device 120. At operation 430 the verifier device 230 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 230 may include a satellite orbit database 364, or be communicatively coupled to a satellite orbit database 364, which includes orbit information about satellites 110 in a known orbit about the earth.

In some embodiments the location data and waypoint data received from the claimant device is compared (operation 430) with location and waypoint data from the known data set to determine whether the claimant device 120 is, in fact, within a reasonable threshold distance of an expected geographic location at an expected time. By way of example and not limitation, the satellite orbit database 364 may be searched for a data record corresponding to the distinctive beam parameters transmitted from the claimant device 120. When a matching record is located, the orbit data from the record retrieved from the orbit database 364 may be compared to the data received from the claimant device 120. For example, the known data may comprise a coordinate for the center of the spot beam 130 and an indication of the radius of the spot beam 130 on the surface of the earth. The coordinates received from the claimant device 120 may be compared to the location of the spot beam to determine whether the received data indicates that the claimant device 120 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 435, the data received from the claimant device 120 indicates that the claimant device 120 is within a geographic region encompassed by the spot beam from the satellite 110 at the time associated with the data from the claimant device, then the claimant device 120 may be considered authenticated. In an authentication system, control then passes to operation 440 and the claimant is allowed to access a resource. By way of example and not limitation, the verifier device 230 may grant a token to an authenticated claimant device 120. The token may be used by a remote system to grant access to a resource.

By contrast, if the data received from the claimant device 120 indicates that the claimant device 120 is not within a geographic region encompassed by the spot beam from the satellite 110 at the time associated with the data from the claimant device 120, then the claimant device 120 may not be considered authenticated. In an authentication system, control then passes to operation 445 and the claimant is denied access to a resource. By way of example and not limitation, the verifier device 230 may deny a token to an authenticated claimant device 120. In the absence of a token the claimant device may be denied access to a resource managed by a remote system.

Thus, the system architecture depicted in FIGS. 1-3 and the method depicted in FIG. 4 enable satellite-based authentication of one or more claimant device(s) 120. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 120 are authenticated to use a resource for an entire session. In other embodiments the system may implement message-based authentication in which the claimant device(s) 120 must be authenticated separately for each message transmitted from the claimant device(s) 120 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 120. During the course of a scheduled mission a logistics system may periodically poll the claimant device(s) 120, which may respond with authentication data obtained from the satellite 110. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e. The claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 110 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 110). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
    receiving, at a verifier device, one or more distinctive beam parameters corresponding to a spot beam transmission of a satellite, wherein the one or more distinctive beam parameters include a pseudorandom code and a time stamp;
    receiving, at the verifier device, first location information indicating a location of an electronic device;
    determining second location information based on the one or more distinctive beam parameters, the second location information indicating a location of a center of a projection of the spot beam transmission; and
    authenticating the electronic device when a difference between the location of the electronic device and the center of the projection of the spot beam transmission is less than a threshold.

2. The method of claim 1, wherein the spot beam transmission is emitted from at least one of a low earth orbit satellite, a medium earth orbit satellite, a geosynchronous earth orbit satellite, or a pseudo-satellite.

3. The method of claim 1, wherein authenticating the electronic device includes performing a one-way authentication process.

4. The method of claim 1, wherein authenticating the electronic device includes performing a multi-way authentication process.

5. The method of claim 4, wherein authenticating the electronic device includes performing a multi-way peer to peer device authentication process.

6. The method of claim 1, further comprising receiving a second time stamp from the electronic device, wherein the second time stamp corresponds to the first location information.

7. The method of claim 1, wherein the first location information is based on an earth-based coordinate system.

8. The method of claim 7, wherein the earth-based coordinate system comprises of a latitude, a longitude, an altitude, a geographic locator, or any combination thereof.

9. The method of claim 1, wherein the one or more distinctive beam parameters further include a timing code segment, a spot beam transmitting vehicle identifier, a beam identifier, a time bias parameter, spot beam transmitting vehicle trajectory data, or any combination thereof.

10. The method of claim 1, wherein authenticating the electronic device is further based on an L-Band frame count.

11. The method of claim 1, wherein the electronic device is authenticated independently for each message transmitted by the electronic device.

12. The method of claim 1, wherein:
    the electronic device establishes a communication session with a remote device; and
    the electronic device is authenticated at least once for the communication session.

13. The method of claim 1, wherein the first location information corresponds to at least two locations of the electronic device at different times, and wherein the at least two locations are compared to at least two locations of the center of the projection of the spot beam transmission at the different times.

14. The method of claim 1, further comprising enabling the electronic device to access a service when the electronic device has been authenticated.

15. The method of claim 1, further comprising denying service to the electronic device when the electronic device has not been authenticated.

16. The method of claim 1, wherein determining the second location information comprises searching a satellite orbit database based on the distinctive beam parameters and retrieving orbit data from the satellite orbit database.

17. The method of claim 1, wherein the second location information corresponds to a time indicated by the time stamp.

18. The method of claim 1, wherein the threshold is based on, but not equal to, a radius of the projection of the spot beam.

19. An apparatus comprising:
a processor; and
a memory module comprising instructions that, when executed by the processor, cause the processor to perforin operations comprising:
  receiving one or more distinctive beam parameters corresponding to a spot beam transmission of a satellite, wherein the one or more distinctive beam parameters include a pseudorandom code and a time stamp;
  receiving first location information indicating a location of an electronic device;
  determining second location information based on the one or more distinctive beam parameters, the second location information indicating a location of a center of a projection of the spot beam transmission; and
  authenticating the electronic device when a difference between the location of the electronic device and the center of the projection of the spot beam transmission is less than a threshold.

20. The apparatus of claim 19, wherein the distinctive beam parameters further include a timing code segment, a spot beam transmitting vehicle identifier, a time bias parameter, a beam identifier, spot beam transmitting vehicle trajectory data, or any combination thereof.

21. The apparatus of claim 19, wherein the electronic device is authenticated independently for each message transmitted from the electronic device.

22. The apparatus of claim 19, wherein:
the electronic device establishes a communication session with a remote device; and
the electronic device is authenticated at least once for the communication session.

23. The apparatus of claim 19, wherein the distinctive beam parameters include a series of waypoint data snapshots over time.

24. The apparatus of claim 19, wherein the operations further comprise enabling the electronic device to access a service provided by a remote host when the electronic device has been authenticated.

25. A system comprising:
at least one signal source configured to transmit a spot beam transmission in accordance with a spot-beam geometry;
an electronic device comprising a receiver, wherein the receiver is configured to receive one or more distinctive beam parameters corresponding to the spot beam transmission, wherein the one or more distinctive beam parameters comprise a pseudorandom code and a time stamp; and
a verifier device communicatively coupled to the electronic device, wherein the verifier device is configured to:
  receive the one or more distinctive beam parameters;
  receive first location information indicating a location of the electronic device;
  determine second location information based on the one or more distinctive beam parameters, the second location information indicating a location of a center of a projection of the spot beam transmission; and
  authenticate the electronic device when a difference between the location of the electronic device and the center of the projection of the spot beam transmission is less than a threshold.

26. The system of claim 25, wherein the electronic device is configured to determine the location of the electronic device.

27. The system of claim 25, wherein the at least one signal source comprises at least one of the following: low earth orbit satellite, a medium earth orbit satellite, a geosynchronous earth orbit satellite, or a pseudo-satellite.

28. The system of claim 25, wherein the electronic device comprises a mobile phone, a portable computing device, a computer network node, a server, a wireless networking node, or any combination thereof.

29. The system of claim 25, wherein the electronic device further comprises a biometric verification system.

30. The system of claim 25, wherein the verifier device is further configured to compare the first location information to the second location information, wherein the difference between the location of the electronic device and the center of the projection of the spot beam transmission is based on the comparison.

31. A system comprising:
a receiving device configured to communicate with an electronic device and a host network device, wherein the receiving device is configured to receive a pseudorandom code and a time stamp associated with a spot beam transmission of a vehicle; and
an authentication server configured to communicate with the host network device,
wherein the receiving device is configured to transmit an authentication request from the electronic device to the host network device, the authentication request comprising the pseudorandom code and the time stamp, and
wherein the authentication server comprises instructions that, when executed by a processor, cause the processor to perform operations comprising:
  receiving, from the electronic device, one or more distinctive beam parameters, wherein the one or more distinctive beam parameters comprise the pseudorandom code and the time stamp;
  receiving first location information indicating a location of the electronic device;
  determine second location information based on the one or more distinctive beam parameters, the second location information indicating a location of a center of a projection of the spot beam transmission; and
  authenticating the electronic device when a difference between the location of the electronic device and the center of the projection of the spot beam transmission is less than a threshold.

* * * * *